(12) United States Patent
Uhlik et al.

(10) Patent No.: US 7,352,774 B2
(45) Date of Patent: Apr. 1, 2008

(54) MULTIPLEXING DIFFERENT TYPES OF DATA SEQUENCES

(75) Inventors: Christopher R. Uhlik, Danville, CA (US); Douglas C. Dahlby, Fremont, CA (US); Rabih Chrabieh, San Francisco, CA (US)

(73) Assignee: Arraycomm, LLC, San Jose, CA (US)

( * ) Notice: Subject to any disclaimer, the term of this patent is extended or adjusted under 35 U.S.C. 154(b) by 1138 days.

(21) Appl. No.: 10/262,427

(22) Filed: Sep. 30, 2002

(65) Prior Publication Data

US 2004/0062276 A1    Apr. 1, 2004

(51) Int. Cl.
    *H04J 3/24* (2006.01)
(52) U.S. Cl. .................. 370/474; 370/476
(58) Field of Classification Search ......... 370/252, 370/389, 392, 471, 473, 474, 476
    See application file for complete search history.

(56) References Cited

U.S. PATENT DOCUMENTS

| | | | |
|---|---|---|---|
| 5,271,004 A * | 12/1993 | Proctor et al. ............. | 370/392 |
| 5,642,353 A | 6/1997 | Roy, III et al. | |
| 5,796,743 A * | 8/1998 | Bunting et al. ............ | 370/474 |
| 5,828,658 A | 10/1998 | Ottersten et al. | |
| 5,991,313 A * | 11/1999 | Tanaka et al. ............. | 370/537 |
| 6,233,251 B1 * | 5/2001 | Kurobe et al. ............. | 370/471 |
| 6,385,451 B1 * | 5/2002 | Kalliokulju et al. ........ | 455/437 |
| 6,493,326 B1 * | 12/2002 | Ramachandran ........... | 370/311 |
| 6,771,659 B1 * | 8/2004 | Parantainen et al. ....... | 370/466 |
| 6,882,841 B1 * | 4/2005 | Youn ......................... | 455/434 |
| 2001/0043615 A1 * | 11/2001 | Park et al. .................. | 370/474 |
| 2003/0060210 A1 * | 3/2003 | Ravishankar et al. ...... | 455/452 |

OTHER PUBLICATIONS

Shan N J: "Portable Broadband Internet Access: System and Services", Proceedings of 11th International Symposium on Personal, Indoor And Mobile Radio Communication, London, UK, vol. 2, Sep. 18-21, 2000, pp. 1207-1209, XP002265896.

Vogiatzis N et al: "An Adaptive Multicarrier Wireless Access System", 2000 IEEE Wireless Communications and Networking Conference Chicago, IL, USA, vol. 1, Sep. 23-28, 2000, pp. 298-303, XP010532513.

* cited by examiner

*Primary Examiner*—Huy D. Vu
*Assistant Examiner*—Christine Ng
(74) *Attorney, Agent, or Firm*—Blakely Sokoloff Taylor & Zafman

(57) ABSTRACT

According to an embodiment of the invention, a method and apparatus are described for data bit sequences. According to an embodiment of the invention, a header is inserted in a data burst. One or more high priority messages of a first type are optionally inserted in the data burst starting after the header. One or more messages of a second type are optionally inserted into the data burst starting at an end of the data burst. One or more low priority messages of the first type are optionally inserted in the data.

39 Claims, 7 Drawing Sheets

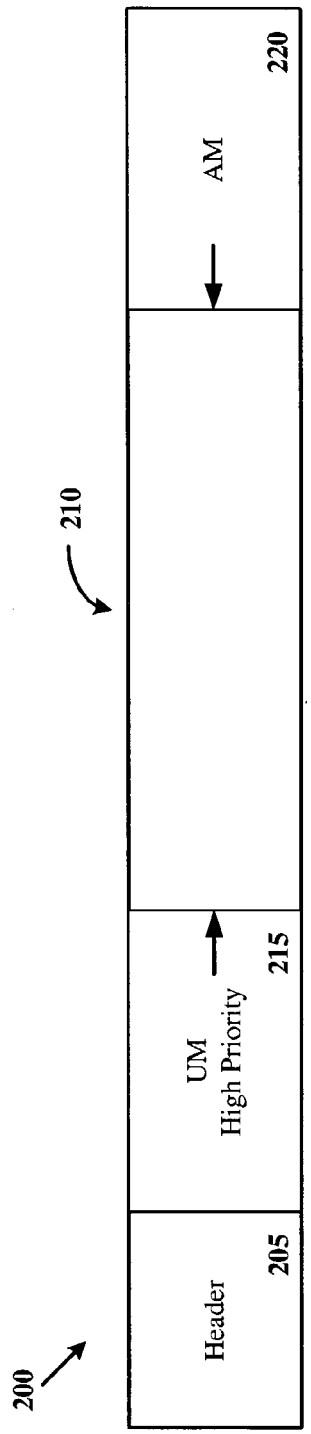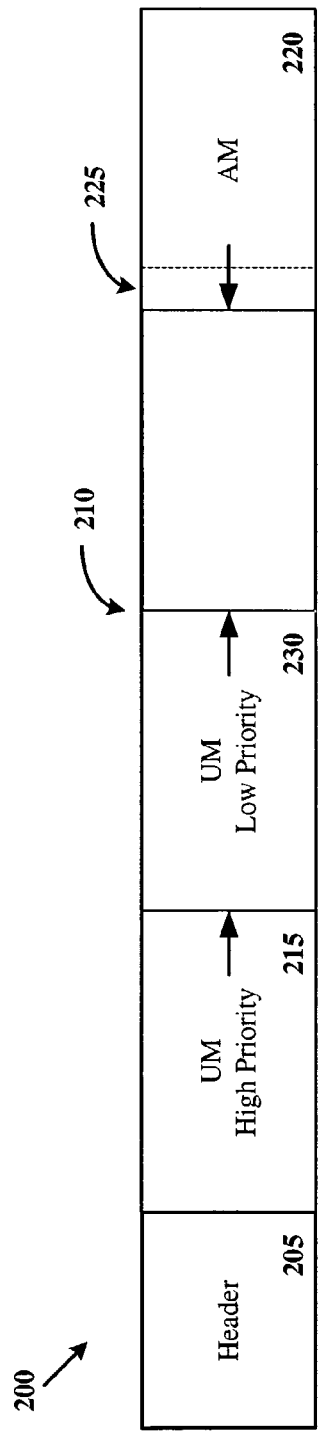
Figure 3A
Figure 3B

MULTIPLEXING DIFFERENT TYPES OF DATA SEQUENCES

FIELD OF THE INVENTION

The invention relates generally to the field of wireless data and voice communications. More particularly, the invention relates to multiplexing different types of data sequences into a burst for transmission.

DESCRIPTION OF THE RELATED ART

In communications, a data burst may be transmitted over a channel, the channel having a particular timeslot and frequency. In the communications process, there may be different types of data sequences that are to be transmitted in data bursts. The different types of data sequences may be incompatible and require different decoding operations.

If the different types of data sequences are transmitted separately, either in separate data bursts or over different communications channels, this may result in an inefficient usage of communications capacity. Depending on the quantity of messages of each type, data bursts may be transmitted that do not contain as much data as possible. However, multiplexing the data sequences together may cause complications in decoding because of the incompatibility of the data sequences.

BRIEF SUMMARY OF THE INVENTION

A method and apparatus are provided for multiplexing different types of data sequences. In one embodiment of the invention, a header is inserted in a data burst. One or more high priority messages of a first type are optionally inserted in the data burst starting after the header. One or more messages of a second type are optionally inserted into the data burst starting at an end of the data burst. One or more low priority messages of the first type are optionally inserted in the data burst.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements, and in which:

FIG. 3A is an illustration of the insertion of messages of a second type in a data burst according to an embodiment of the invention;

FIG. 3B is an illustration of the insertion of low priority messages of a first type in a data burst according to an embodiment of the invention;

DETAILED DESCRIPTION OF THE INVENTION

Overview

Figure 1:
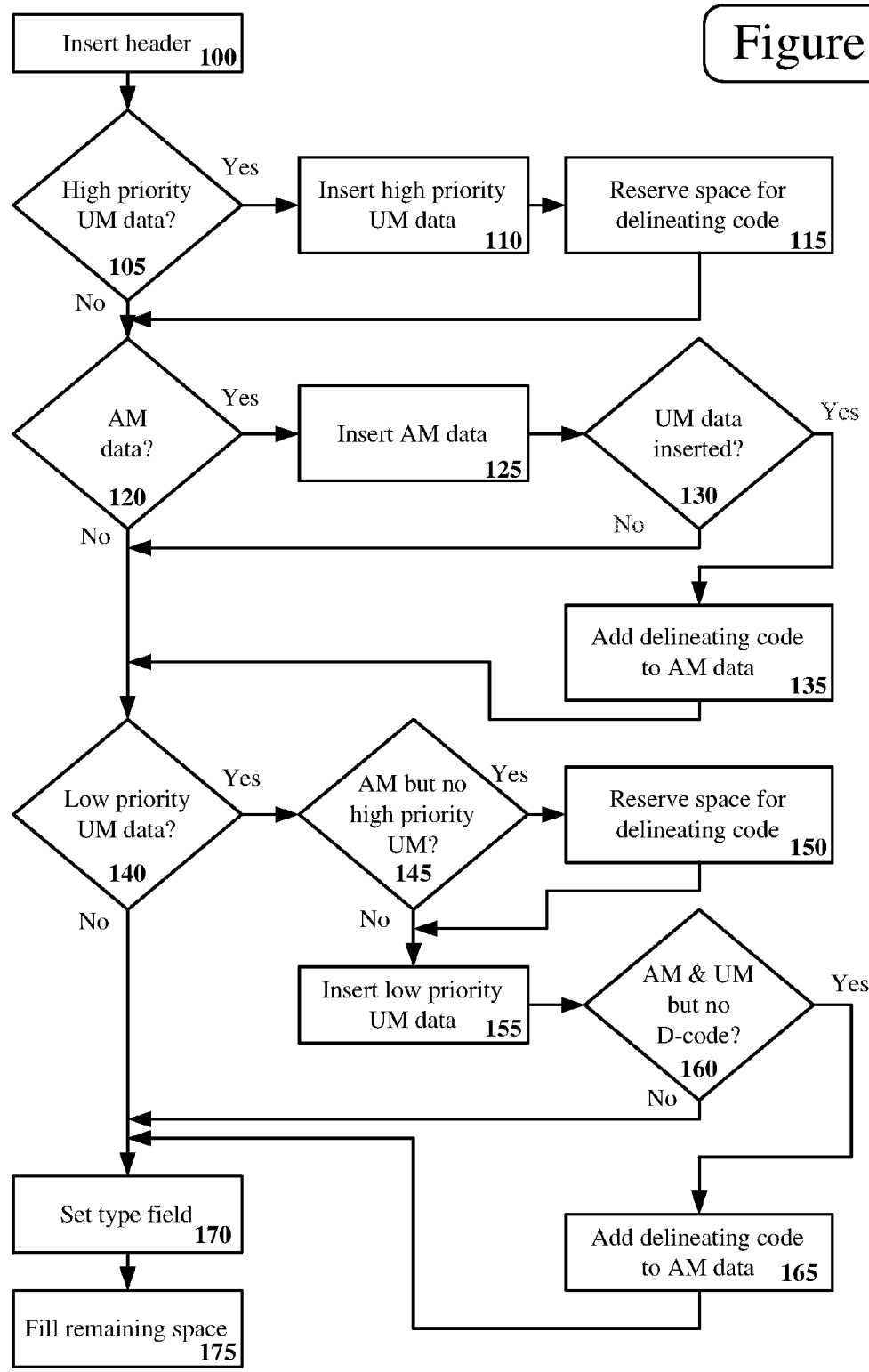
FIG. 1 is a flow diagram illustrating the coding of a data burst according to an embodiment of the invention.

One embodiment of the present invention provides for multiplexing of acknowledged messages and unacknowledged messages. A header of fixed size is inserted into a data payload. High priority unacknowledged messages are optionally inserted into the data payload after the end of the header. Acknowledged messages are optionally inserted from the end of the data payload. Low priority unacknowledged messages are optionally inserted with the high priority unacknowledged messages. Any remaining space is filled with no operation codes or random data bits.

In one embodiment, it is contemplated the invention is implemented in a TDD (time division duplex) high bandwidth wireless data and voice system, such as ArrayComm's i-BURST™ system. However, it should be appreciated the invention is not limited to the i-BURST system or any other particular air interface, and in fact it should become apparent from the description herein that the invention may find use with a variety of air interface protocols and communications systems.

Multiplexing

In one embodiment of the invention, messages of a first type and messages of a second type are multiplexed together in a data burst for transmission over a single communications channel, the channel having a particular timeslot and frequency. The messages are multiplexed so as to allow efficient and flexible coding of messages, and to allow efficient decoding of the messages after reception.

In the present example, two types of messages are used. Additional or different types of messages can be accommodated using the principles described below. The first type of messages is for unacknowledged mode (UM) data traffic, which means that there is no ARQ (automatic repeat request) retransmission strategy. The second type of messages is for acknowledged mode (AM) data traffic, for which there is an ARQ retransmission strategy. The unacknowledged mode traffic may form a prefix code of an arbitrary number of bits, meaning that each message in a bit stream can be uniquely identified by parsing the bit stream from the beginning.

In one embodiment of the invention, a data burst begins with a header of fixed length. The header may include a type field to indicate what types of messages are included in the data burst. For example, the type field can indicate either that there are messages of the first type and of the second type, or that there are only messages of the second type. More specifically, for AM and UM messaging, the header includes a type field of two bits with values that are set as indicated in Table 1.

TABLE 1

| Type Field | |
|---|---|
| Bit Values | Interpretation |
| 00 | Payload is purely AM data |
| 01 | Payload is a mixture of AM and UM data |

TABLE 1-continued

Type Field

| Bit Values | Interpretation |
|---|---|
| 10 | [reserved] |
| 11 | [reserved] |

In the present example, each of the UM messages has a priority. For example, there may be high priority UM messages and low priority UM messages. The priority of each UM message is included in the process of multiplexing messages in a data burst. A header is of fixed size and can be inserted into a data burst at any location, for example at the beginning of the data burst. The remainder of the data burst is then available for messages.

FIG. 1 is a flow diagram illustrating the formation of a data burst. A header is inserted in the data burst, 100. High priority UM messages, 105, can optionally be inserted in the data burst, 110, for example beginning after the header. In other embodiments the order of UM messages may be modified. For example, high priority and low priority UM messages may be mixed together in the data burst 100. If any high priority UM messages have been inserted in the data burst, then space can be reserved in the data burst for a delineating code, 115. The delineating code indicates that any message after the code is an AM message.

After high priority UM messages, if any, have been inserted in the data burst, AM messages of the second type if available, 120, can optionally be inserted in the data burst, 125, beginning, for example at an end of the data burst. If high priority UM messages have been inserted, 130, then a delineating code is added to the beginning of the AM messages, 135. Any space remaining in the data burst will be between the high priority UM messages (or the header if there are no such messages) and the AM messages (or the end of the data burst if there are no such messages).

After the messages of the second type have been inserted in the data burst, then low priority UM messages, 140, are optionally inserted in the data burst. If AM messages have been inserted in the data burst but high priority UM messages have not been inserted, 145, then space is reserved for a delineating code, 150. The low priority UM messages are inserted, 155, beginning in the space available towards the beginning of the data burst, which is after the high priority UM messages, if any, or after the header, if no high priority UM messages are included. If there are both UM messages and AM messages and a delineating code has not already been added to the AM messages, 160, then the delineating code is added to the beginning of the AM messages, 165.

After the messages have been inserted into the data burst, a type field in the header is set to indicate what types of messages are included in the data burst, 170. The remaining space in the data burst, if any, is then filled 175. In one example, the remaining space may be filled entirely with "no operation" codes, or idle bits, which imply that the portion of data burst is unused. In another example, a single no operation code is inserted after the UM data to indicate the end of the UM messages, with the other remaining space filled with random bits that do not form a sequence matching the delineating code.

Figure 2A:
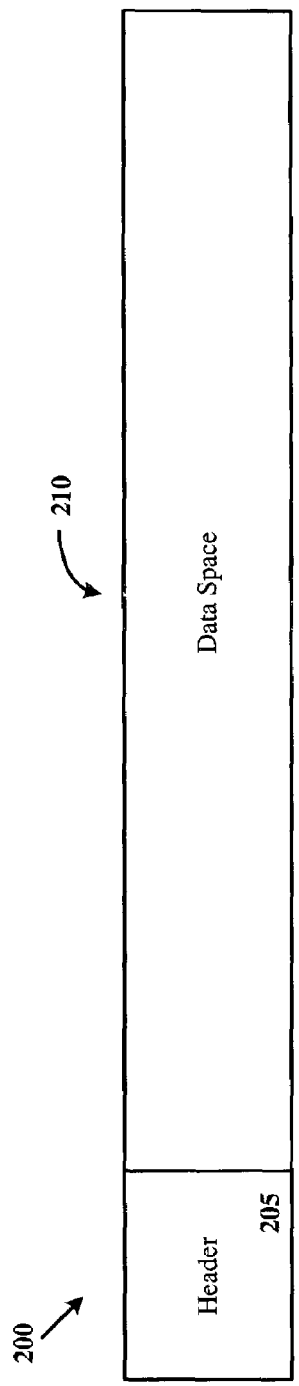
FIG. 2A is an illustration of a data burst according to an embodiment of the invention.
Figure 2B:
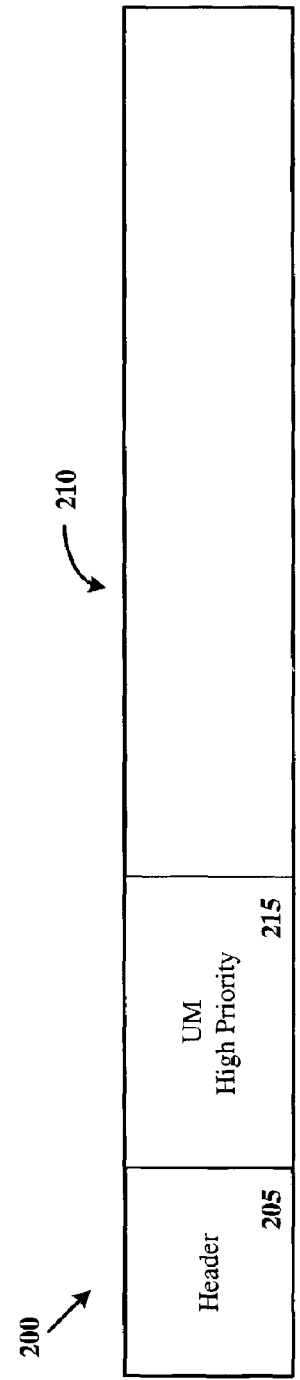
FIG. 2B is an illustration of the insertion of high priority messages of a first type in a data burst according to an embodiment of the invention.

FIGS. 2A through 4 illustrate the formation of a data burst according to one embodiment of the invention. The particular data burst illustrated is only one example and the invention is not limited to this data structure. In particular, the process of forming a data burst and the resulting data burst structure will vary depending on the number of messages and the types of messages to be sent, if any, in each class of messages. FIG. 2A illustrates a data burst. A header 205 of fixed length is inserted at the beginning of a data burst 200. The remainder of the data burst is data space 210 available for messages. FIG. 2B illustrates a data burst in which high priority UM messages 215 are then optionally inserted in the data burst 200. The high priority UM messages 215 are inserted beginning at the end of the header 205. The remainder of the available data space 210 continues to the end of the data burst 200 for insertion of other messages. If high priority UM messages 215 have been inserted in the data burst 200, space in the data space 210 is reserved for a delineating code to indicate that the rest of the data burst 210 will contain AM messages.

FIG. 3A illustrates the insertion of AM messages 220 into the data burst 200. The AM messages are optionally inserted in the data space 210 beginning at the end of the data burst 200. If high priority UM messages 215 have been inserted in the data burst 200, then a delineating code 225 is added to the beginning of the AM messages 220, the delineating code 225 indicating that the remainder of the message after the delineating code 225 contains AM messages 220. The remainder of the available data space, if any, in the data space 210 is between the high priority UM messages 215 and the AM messages 220.

FIG. 3B illustrates the insertion of low priority UM messages 230. If no high priority UM messages have been added, then space is reserved for the delineating code 225. To the extent that space is available, the low priority UM messages 230 are optionally inserted in the data burst 200 after the header and the high priority UM messages 215, if any. In this example, the remaining data space 210 in the data burst 200, if any, is between the low priority UM messages 230 and the AM messages 220. If UM messages and AM messages have been inserted in the data burst 200 and the delineating code 225 has not already been added to the AM messages 220, the delineating code 225 is then added to the AM messages 220. In the illustrated embodiment, the low priority UM messages 230 follow the high priority UM messages 215, but this may vary in other embodiments. For example, high and low priority UM messages may be mixed together in a data burst.

Figure 4:
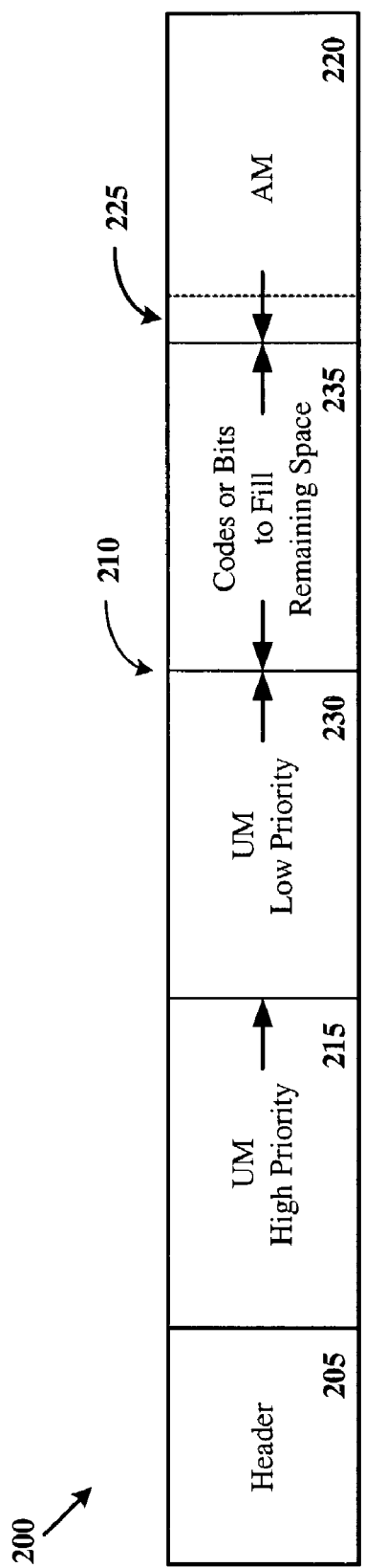
FIG. 4 is an illustration of filling the remaining space of a data burst according to an embodiment of the invention.

If there is space available in the data space 210 after the insertion of messages in the data burst 225, then codes are inserted to fill the remaining space. In one example, the remaining space may be filled entirely with no operation codes. In another example, a single no operation code is inserted after the high priority UM messages 215 and the low priority UM messages 230 to indicate the end of the UM messages, with the remaining space data space 210 filled with random data bits that do not form a sequence matching the delineating code. FIG. 4 illustrates the insertion of codes in the data burst 200. In this example, the codes to fill the remaining space 230 fill the space between the low priority UM messages 225 and the messages of the second type 220.

FIGS. 2A-4 demonstrate specific examples in the process of coding a data burst, but the process may vary depending on the circumstances, including differences in how many messages of each type are inserted and the amount of remaining space available after each type of message have been inserted. In some cases there may not be sufficient space to insert certain messages and the structure of the data burst may be altered to accommodate the messages. In one example, if there is insufficient space to insert a message of one type, a small amount of data from the portion of the data burst containing messages of the other type may be removed to allow insertion of the message.

Decoding

In the embodiment of the invention described above, a data burst to be decoded may contain messages of a first type (UM data), messages of a second type (AM data), or both. The AM messages, if any, are predefined messages forming prefix codes of an arbitrary number of bits, meaning that each message in a bit stream can be uniquely identified by parsing the bit stream from the beginning. The data burst contains a type field to indicate what types of messages are included in the data burst. In one example, the type field indicates either that there are both UM messages and AM messages, or that there are only AM messages.

Figure 5:
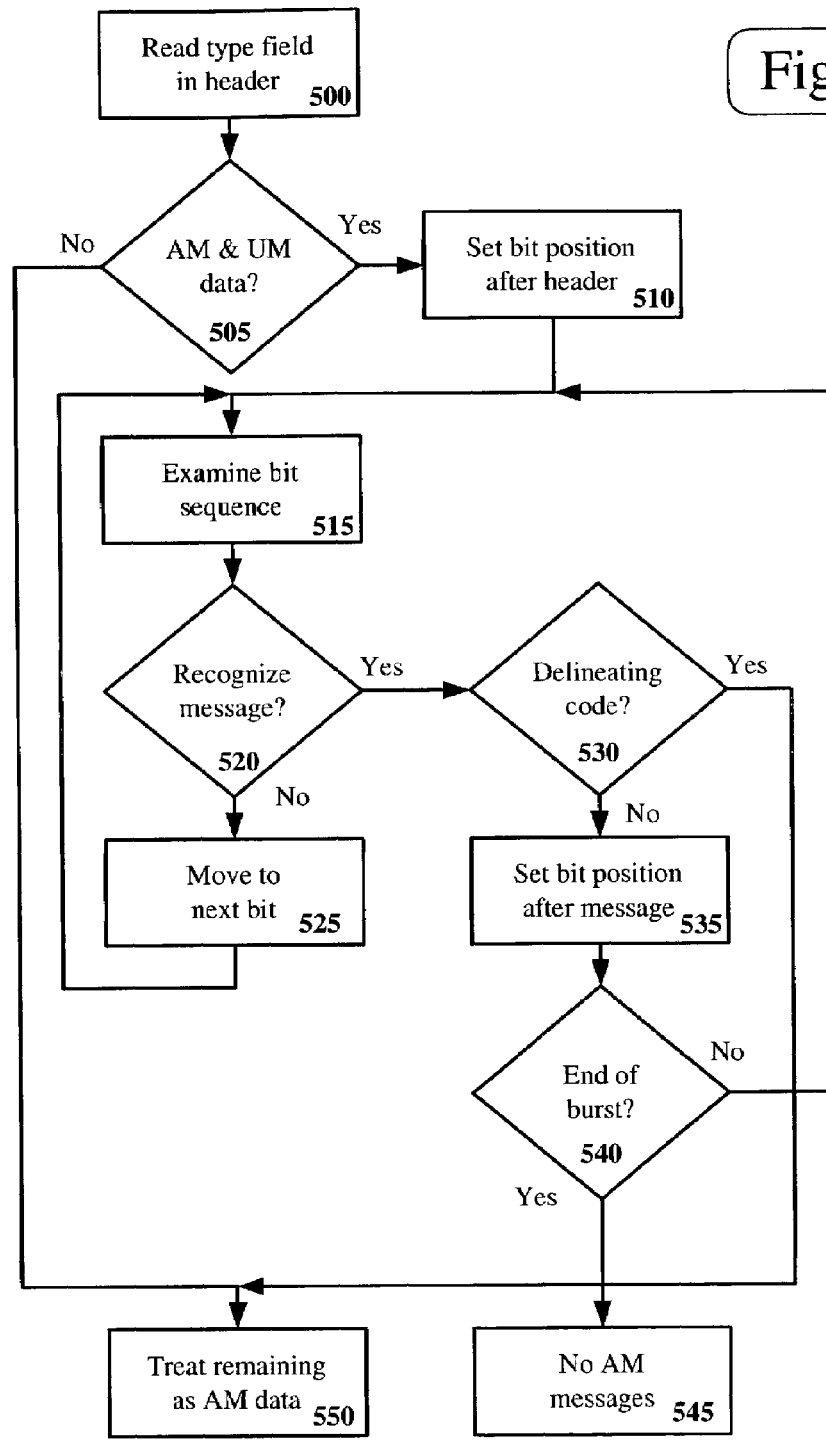
FIG. 5 is flowchart illustrating the decoding of a data burst according to an embodiment of the invention.

FIG. 5 is a flow diagram illustrating the decoding of a data burst. The type field in the header of the data burst is read, 500. If the type field indicates that there are only AM messages, 505, the data in the data burst is then interpreted as AM messages through the end of the data burst, 550.

If the type field indicates that the data burst includes both UM messages and AM messages, 505, a bit position is set after the header, 510. The bits are examined successively, 515-525, until one of the predefined messages is identified, 520. The bit position is then set to the bit position after the identified message, 535. This process continues until the end of the data burst is reached, 540, indicating that there are no AM messages, 545, or until a message is recognized that is a delineating code, 530. The delineating code indicates that the remainder of the message contains AM messages. If the delineating code is identified, then the remainder of the data burst is interpreted as AM messages, 550.

Base Station Structure

Figure 6:
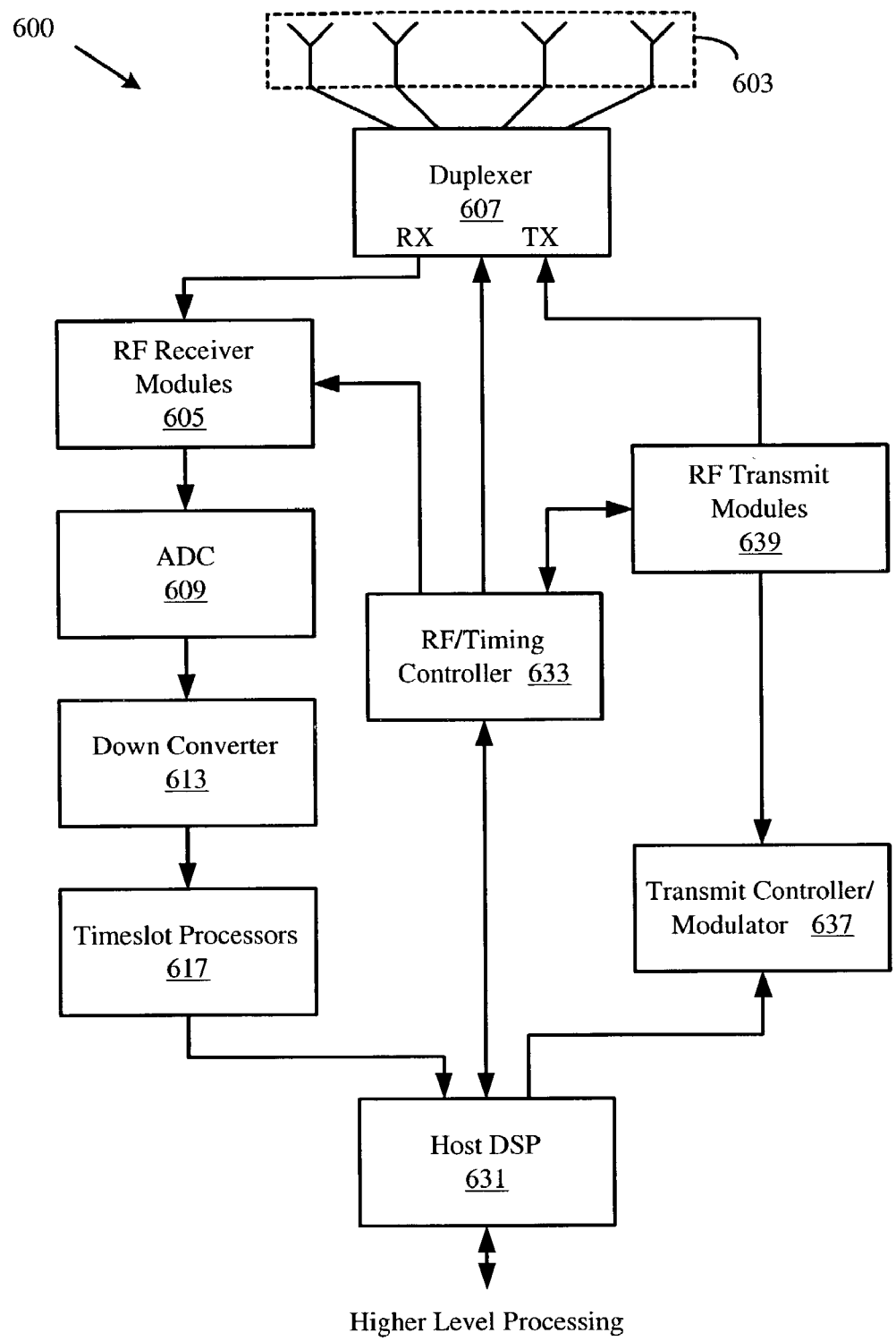
FIG. 6 is a simplified block diagram illustrating a base station on which an embodiment of the invention can be implemented.

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 6 shows an example of a base station 600 of a wireless communications system or network suitable for implementing the present invention. The system or network includes a number of subscriber stations, also referred to as remote terminals or user terminals, such as that shown in FIG. 4. The base station 600 may be connected to a wide area network (WAN) through its host DSP 631 for providing any required data services and connections external to the immediate wireless system. To support spatial diversity, a plurality of antennas 603 is used, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 631 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station 600 to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. Nos. 5,828,658, issued Oct. 27, 1998 to Ottersten et al. and 5,642,353, issued Jun. 24, 1997 to Roy, III et al. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 607, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 605, and are converted down in analog by RF receiver ("RX") modules 605 from the carrier frequency to an FM intermediate frequency ("IF"). This signal then is digitized (sampled) by analog to digital converters ("ADCs") 609. Final down-converting to baseband is carried out digitally. Digital filters can be used to implement the down-converting and the digital filtering, the latter using finite impulse response (FIR) filtering techniques. This is shown as block 613. The invention can be adapted to suit a wide variety of RF and IF carrier frequencies and bands.

There are, in the present example, eight down-converted outputs from each antenna's digital filter 613, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 617 (hereinafter "timeslot processor") for further processing, including calibration, according to one aspect of this invention. Eight Motorola DSP56300 Family DSPs can be used as timeslot processors, one per receive timeslot. The timeslot processors 617 monitor the received signal power and estimate the frequency offset and time alignment. They also determine smart antenna weights for each antenna element. These are used in the SDMA scheme to determine a signal from a particular remote user and to demodulate the determined signal.

The output of the timeslot processors 617 is demodulated burst data for each of the eight receive timeslots. This data is sent to the host DSP processor 631 whose main function is to control all elements of the system and interface with the higher level processing, which is the processing which deals with what signals are required for communications in all the different control and service communication channels defined in the system's communication protocol. The host DSP 631 can be a Motorola DSP56300 Family DSP. In addition, timeslot processors send the determined receive weights for each user terminal to the host DSP 631. The host DSP 631 maintains state and timing information, receives uplink burst data from the timeslot processors 617, and programs the timeslot processors 617. In addition it decrypts, descrambles, checks error correcting code, and deconstructs bursts of the uplink signals, then formats the uplink signals to be sent for higher level processing in other parts of the base station 600. Furthermore DSP 631 may include a memory element to store data, instructions, or hopping functions or sequences. Alternatively, the base station 600 may have a separate memory element or have access to an auxiliary memory element. With respect to the other parts of the base station 600 it formats service data and traffic data for further higher processing in the base station 600, receives downlink messages and traffic data from the other parts of the base station 600, processes the downlink bursts and formats and sends the downlink bursts to a transmit controller/modulator, shown as 637. The host DSP also manages programming of other components of the base station 600 including the transmit controller/modulator 637 and the RF timing controller shown as 633.

The RF controller 633 reads and transmits power monitoring and control values, controls the duplexer 607 and receives timing parameters and other settings for each burst from the host DSP 631.

The transmit controller/modulator 637, receives transmit data from the host DSP 631. The transmit controller uses this data to produce analog IF outputs which are sent to the RF transmitter (TX) modules 639. Specifically, the received data bits are converted into a complex modulated signal, up-converted to an IF frequency, sampled, multiplied by transmit weights obtained from host DSP 631, and converted via digital to analog converters ("DACs") which are part of transmit controller/modulator 637 to analog transmit waveforms. The analog waveforms are sent to the transmit modules 639. The transmit modules 639 up-convert the signals to the transmission frequency and amplify the signals. The amplified transmission signal outputs are sent to antennas 603 via the duplexer/time switch 607.

Remote Terminal Structure

Figure 7:
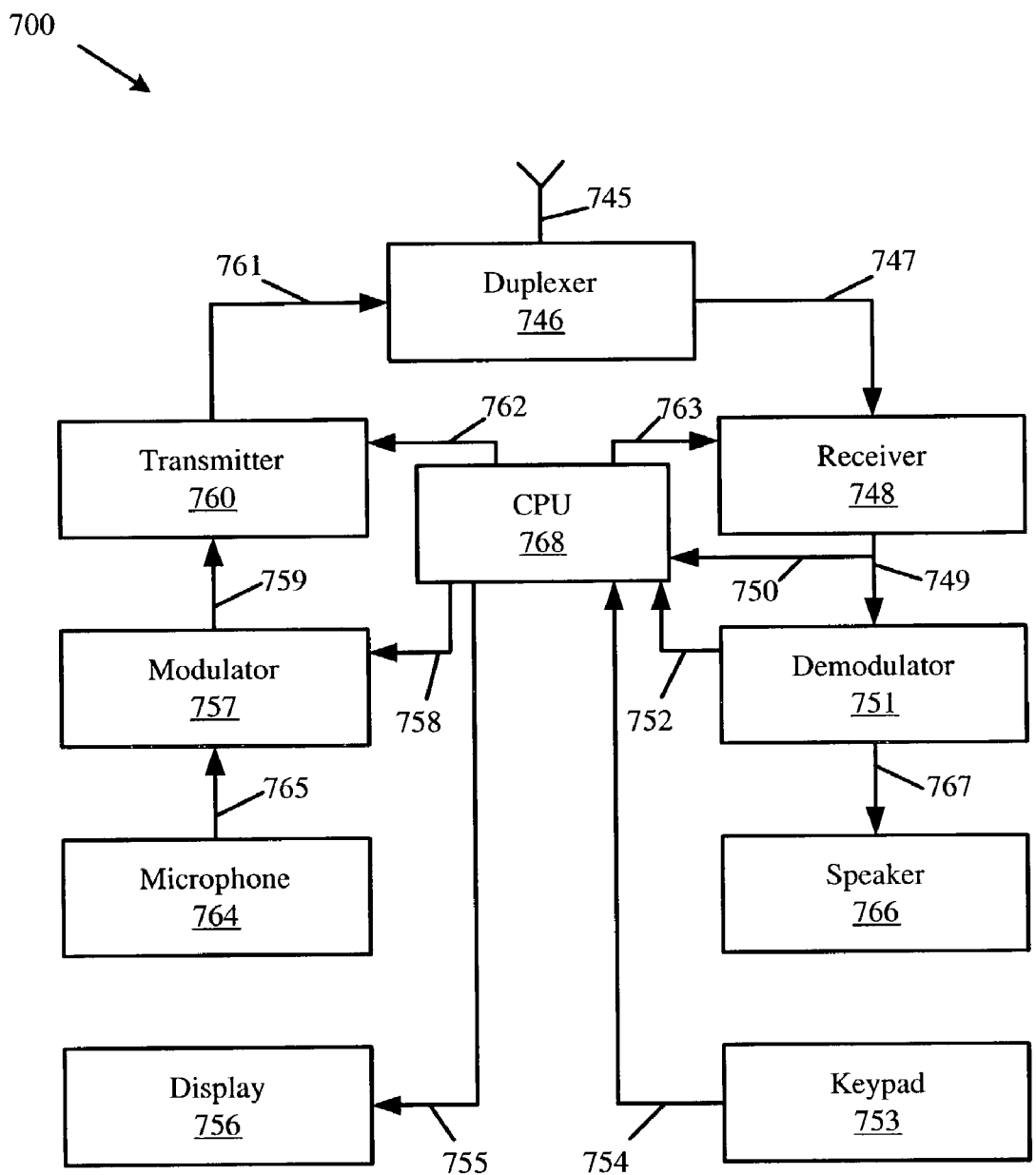
FIG. 7 is a simplified block diagram illustrating a remote terminal on which an embodiment of the invention can be implemented.

FIG. 7 depicts an example component arrangement in a remote terminal 700 that provides data or voice communication. The remote terminal's 700 antenna 745 is connected to a duplexer 746 to permit the antenna 745 to be used for both transmission and reception. The antenna can be omni-directional or directional. For optimal performance, the antenna can be made up of multiple elements and employ spatial processing as discussed above for the base station 500. In an alternate embodiment, separate receive and transmit antennas are used eliminating the need for the duplexer 746. In another alternate embodiment, where time division duplexing is used, a transmit/receive (TR) switch can be used instead of a duplexer as is well known in the art. The duplexer output 747 serves as input to a receiver 748. The receiver 748 produces a down-converted signal 749, which is the input to a demodulator 751. A demodulated received sound or voice signal 767 is input to a speaker 766.

The remote terminal 700 has a corresponding transmit chain in which data or voice to be transmitted is modulated in a modulator 757. The modulated signal to be transmitted 759, output by the modulator 757, is up-converted and amplified by a transmitter 760, producing a transmitter output signal 761. The transmitter output 761 is then input to the duplexer 746 for transmission by the antenna 745.

The demodulated received data 752 is supplied to a remote terminal central processing unit 768 (CPU) as is received data before demodulation 750. The remote terminal CPU 768 can be implemented with a standard DSP (digital signal processor) device such as a Motorola series 56300 Family DSP. This DSP can also perform the functions of the demodulator 751 and the modulator 757. The remote terminal CPU 768 controls the receiver through line 763, the transmitter through line 762, the demodulator through line 752 and the modulator through line 758. It also communicates with a keypad 753 through line 754 and a display 756 through line 755. A microphone 764 and speaker 766 are connected through the modulator 757 and the demodulator 751 through lines 765 and 767, respectively for a voice communications remote terminal. In another embodiment, the microphone and speaker are also in direct communication with the CPU to provide voice or data communications. Furthermore remote terminal CPU 768 may also include a memory element to store data, instructions, and hopping functions or sequences. Alternatively, the remote terminal 700 may have a separate memory element or have access to an auxiliary memory element.

In one embodiment, the speaker 770, and the microphone 764 are replaced or augmented by digital interfaces well-known in the art that allow data to be transmitted to and from an external data processing device (for example, a computer). In one embodiment, the remote terminal's CPU 768 is coupled to a standard digital interface such as a PCMCIA interface to an external computer and the display, keyboard, microphone and speaker are a part of the external computer. The remote terminal's CPU 768 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention is described in the context of TDD (time division duplexing), but the invention is not limited to this context. The invention is also application to wireless systems in which a pilot signal typically is shared among multiple users at the same time, as is commonly required in standards for CDMA (code division multiple access) systems. Current examples of such wireless systems include WCDMA (wideband CDMA), cdma2000, IS-95, and HDR (high data rate) communications. The present system may also be applied to TDMA (time division multiple access) systems such as GSM (global system for mobile communications).

The present invention includes various steps. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa.

Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using an adaptive antenna array. However, the user terminals can also contain antenna arrays, and can also perform spatial processing both on receiving and transmitting (uplink and downlink) within the scope of the present invention. Any step or process attributed to the uplink can be instead performed on the downlink and vice versa. Furthermore, in portions of the description above, certain functions performed by a base station could be coordinated across the network, or assigned to other components of the system. The invention does not require the use of adaptive antennas, and may be implemented in any system in which two radios are in communication with each other.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
   inserting a header in a data burst at a beginning of the data burst;
   inserting one or more high priority messages of a first type in the data burst starting after the header;
   inserting one or more messages of a second type into the data burst at an end of the data burst, wherein the second type of message comprises acknowledged mode traffic data;
   inserting one or more low priority messages of the first type in the data burst starting after the one or more high priority messages of the first type; and
   transmitting the data burst containing the inserted messages over a communication channel.

2. The method of claim 1, wherein the transmission channel comprises a timeslot and a frequency.

3. The method of claim 1, wherein the first type of message comprises unacknowledged mode traffic data.

4. The method of claim 3, wherein the first type of message comprises data traffic for which there is no automatic repeat request retransmission strategy.

5. The method of claim 1, wherein the second type of message comprises data traffic for which there is an automatic repeat request retransmission strategy.

6. The method of claim 1, wherein unallocated space in the data burst is filled with no operation codes.

7. The method of claim 1, wherein unallocated space in the data burst is filled with a no operation code and one or more random data bits.

8. The method of claim 1, wherein the one or more messages of the second type include a delineating code to indicate a beginning of messages of the second type.

9. The method of claim 1, wherein the header includes a type field.

10. The method of claim 9, wherein the type field indicates whether the message includes messages of the first type.

11. The method of claim 10, wherein the type field comprises two bits of data.

12. A method comprising:
    reading a type field in a header of a data burst;
    if the type field indicates that the data burst includes messages of a first type:
      setting a bit position to the beginning of the messages of the first type;
      examining each bit in the messages of the first type until a pre-defined message of the first type is identified;
      resetting the bit position to a position after an identified pre-defined message, and
      if a delineating code is identified, recovering messages of a second type, wherein the second type of message comprises acknowledged mode traffic data; and
    if the type field indicates that the data burst does not include messages of the first type, recovering messages of the second type.

13. The method of claim 12, wherein the transmission channel comprises a timeslot and a frequency.

14. The method of claim 12, wherein the first type of message comprises unacknowledged mode traffic data.

15. The method of claim 14, wherein the first type of message comprises data traffic for which there is no automatic repeat request retransmission strategy.

16. The method of claim 12, wherein the second type of message comprises data traffic for which there is an automatic repeat request retransmission strategy.

17. The method of claim 12, wherein unallocated space in the data burst is filled with no operation codes.

18. The method of claim 12, wherein unallocated space in the data burst is filled with a no operation code and one or more random data bits.

19. The method of claim 12, wherein the one or more messages of the second type include the delineating code to indicate a beginning of messages of the second type.

20. A method for transmission of data comprising:
placing a header code in a data burst at a beginning of the data burst;
if there are one or more high priority messages of a first type to be transmitted in the data burst:
placing the high priority messages of the first type in the data burst after the header code, and
reserving space in the data burst for a delineating code, the delineating code indicating the beginning of messages of a second type;
if there are one or more messages of the second type to be transmitted in the data burst:
placing the messages of the second type in the data burst at an end of the data burst, and
if high priority messages of the first type have been inserted in the data burst, adding the delineating code to the beginning of the messages of the second type;
if there are low priority messages of the first type to be transmitted in the data burst:
if messages of the second type have been inserted and a delineating code has not already been added, reserving space in the data burst for the delineating code, and
inserting the low priority messages of the first type in the data burst after the header and after the high priority messages of the first type, if any,
if messages of the first type and messages of the second type have been inserted in the data burst and a delineating code has not been added, adding the delineating code to the beginning of the messages of the second type; and
transmitting the data burst over a single communication channel.

21. The method of claim 20, wherein each message of the first type may be identified by parsing the data burst sequentially.

22. The method of claim 21, wherein each message of the first type forms a prefix code of arbitrary length.

23. The method of claim 20, further comprising inserting no operation codes in remaining available space of the data burst after messages have been inserted in the data burst.

24. The method of claim 20, further comprising inserting a no operation code and one or more random data bits in remaining available space of the data burst after messages have been inserted in the data burst.

25. The method of claim 20, wherein the communication channel comprises a timeslot-frequency pair.

26. The method of claim 20, wherein the header comprises a type code.

27. The method of claim 26, wherein the type code indicates the type or types of messages that are included in the data burst.

28. The method of claim 27, further comprising:
receiving the transmitted data burst; and
recovering the messages included in the data burst.

29. The method of claim 28, wherein recovering the messages included in the data burst comprises:
if the type code indicates that messages of the first type are included in the data burst:
parsing the data burst sequentially to identify each message of the first type, and
after the messages of the first type have been recovered, recovering messages of the second type; and
if the type code indicates that messages of the first type are not included in the data burst, recovering the messages of the second type.

30. A radio unit comprising:
a processor to assemble a data burst, the data burst having:
a header placed at a beginning of the data burst,
one or more high priority messages of a first type placed after the header,
one or more messages of a second type placed at an end of the data burst, wherein the second type of message comprises acknowledged mode traffic data,
and one or more low priority messages of the first type placed after the one or more high priority messages of the first type; and
a transmitter to send the data burst assembled by the processor.

31. The radio unit of claim 30, wherein the first type of message comprises unacknowledged mode traffic data.

32. The radio unit of claim 31, wherein the first type of message comprises data traffic for which there is no automatic repeat request retransmission strategy.

33. The radio unit of claim 30, wherein the second type of message comprises data traffic for which there is an automatic repeat request retransmission strategy.

34. The radio unit of claim 30, wherein unallocated space in the data burst is filled with no operation codes.

35. The radio unit of claim 30, wherein unallocated space in the data burst is filled with a no operation code and random data bits.

36. The radio unit of claim 30, wherein the one or more messages of the second type include a delineating code to indicate a beginning of messages of the second type.

37. The radio unit of claim 36, wherein the header includes a type field.

38. The radio unit of claim 37, wherein the type field indicates whether the message includes messages of the first type.

39. A communications system comprising;
means for multiplexing data into data burst, including one or messages comprising high priority unacknowledged mode data placed after a header at a beginning the data burst, one or more messages comprising acknowledged mode data placed at an end of the data burst, and one or messages comprising low priority unacknowledged mode data placed after the one or messages comprising high priority unacknowledged mode data;
means for transmitting the data burst over a communications channel;
means for receiving the data burst; and
means for recovering the one or more messages comprising high priority unacknowledged mode data, the one or more messages comprising low priority unacknowledged mode data, and the one or more messages comprising acknowledged mode data from the data burst.

* * * * *